US012719141B2

(12) United States Patent
Kawakami et al.

(10) Patent No.: US 12,719,141 B2
(45) Date of Patent: Aug. 25, 2026

(54) RESONATOR AND FREQUENCY-TUNABLE RESONATOR

(71) Applicants: NEC CORPORATION, Tokyo (JP); National Institute of Advanced Industrial Science and Technology, Tokyo (JP)

(72) Inventors: Yohei Kawakami, Tokyo (JP); Tomohiro Yamaji, Tokyo (JP); Yoshiro Urade, Ibaraki (JP); Aiko Yamaguchi, Tokyo (JP)

(73) Assignees: NEC CORPORATION, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 145 days.

(21) Appl. No.: 18/439,342

(22) Filed: Feb. 12, 2024

(65) Prior Publication Data

US 2024/0275012 A1 Aug. 15, 2024

(30) Foreign Application Priority Data

Feb. 13, 2023 (JP) ................................ 2023-020226

(51) Int. Cl.

| | |
|---|---|
| ***H01P 1/203*** | (2006.01) |
| ***H01P 1/201*** | (2006.01) |
| ***H01P 3/12*** | (2006.01) |
| ***H01P 7/08*** | (2006.01) |

(52) U.S. Cl.

CPC ............ *H01P 1/2013* (2013.01); *H01P 3/121* (2013.01); *H01P 7/088* (2013.01)

(58) Field of Classification Search

CPC .. H01P 1/203; H01P 1/20363; H01P 1/20381; H01P 1/2039; H01P 1/2013; H01P 1/201; H01P 1/2016; H01P 1/20; H01P 3/026; H01P 3/003; H01P 3/006; H01P 7/08; H01P 7/086; H01P 7/082

USPC .......................................................... 333/204

See application file for complete search history.

(56) References Cited

U.S. PATENT DOCUMENTS

| | | | | |
|---|---|---|---|---|
| 3,093,805 A * | 6/1963 | Osifchin | H01P 3/081 | 174/268 |
| 7,397,331 B2 * | 7/2008 | Koizumi | H01P 1/2013 | 333/204 |
| 2019/0147359 A1 * | 5/2019 | Chen | G06N 10/20 | 257/31 |

FOREIGN PATENT DOCUMENTS

| | | |
|---|---|---|
| JP | 2005-294382 A | 10/2005 |
| JP | 2010-087830 A | 4/2010 |
| JP | 6437607 B1 | 12/2018 |
| JP | 6749382 B2 | 9/2020 |

(Continued)

OTHER PUBLICATIONS

K. Nakagawa et al., "Transmission properties of fishbone-type superconducting transmission lines", Oct. 22, 2020, Japanese Journal of Applied Physics, vol. 59, No. 11, 110904, 5pages.

*Primary Examiner* — Stephen E. Jones
(74) *Attorney, Agent, or Firm* — Sughrue Mion, PLLC

(57) ABSTRACT

An object is to provide a stepped impedance resonator capable of efficiently reducing a footprint. A resonator includes a coplanar waveguide and a section. The coplanar waveguide has a first impedance. The section has a second impedance different from the first impedance and includes a fishbone waveguide. The resonator is configured as a stepped impedance resonator in which the coplanar waveguide and the section including the fishbone waveguide are connected in series.

10 Claims, 12 Drawing Sheets

(56) References Cited

FOREIGN PATENT DOCUMENTS

| | | | | |
|---|---|---|---|---|
| JP | 2022-111146 | A | 7/2022 | |
| WO | WO-8302687 | A1 * | 8/1983 | .............. H01P 3/003 |
| WO | 2012/102385 | A1 | 8/2012 | |

* cited by examiner

RESONATOR AND FREQUENCY-TUNABLE RESONATOR

INCORPORATION BY REFERENCE

This application is based upon and claims the benefit of priority from Japanese patent application No. 2023-20226, filed on Feb. 13, 2023, the disclosure of which is incorporated herein in its entirety by reference.

TECHNICAL FIELD

The present disclosure relates to a resonator and a frequency-tunable resonator.

BACKGROUND ART

In a superconducting quantum circuit used for a qubit or the like, a coplanar waveguide (CPW) is widely used as a high-frequency transmission line. A CPW has a simple structure that forms a pattern on the surface of a substrate and has inductance and capacitance itself. Therefore, it is possible to configure a resonator such as a stepped impedance resonator (Hereinafter, SIR) in which CPWs each having different impedance are combined (e.g., International Patent Publication No. WO2012/102385 and Japanese Unexamined Patent Application Publication No. 2010-87830).

SUMMARY

However, since a linear CPW with a length of the same order as the wavelength of a resonance frequency is required to form a distributed constant type SIR, a long chip shape is required to mount a resonator. Therefore, the chip shape and pattern design are restricted due to an area occupied by the chip or a footprint size.

The present disclosure is made in view of the above circumstances, and an object of the present disclosure is to provide a stepped impedance resonator capable of efficiently reducing a footprint.

An aspect of the present disclosure is a resonator including: a coplanar waveguide having a first impedance; and a section having a second impedance different from the first impedance and including a fishbone waveguide, in which the resonator is configured as a stepped impedance resonator in which the coplanar waveguide and the section including the fishbone waveguide are connected in series.

According to the present disclosure, it is possible to provide a stepped impedance resonator capable of efficiently reducing a footprint.

BRIEF DESCRIPTION OF DRAWINGS

The above and other aspects, features and advantages of the present disclosure will become more apparent from the following description of certain exemplary embodiments when taken in conjunction with the accompanying drawings, in which.

EXAMPLE EMBODIMENTS

Figure 1:
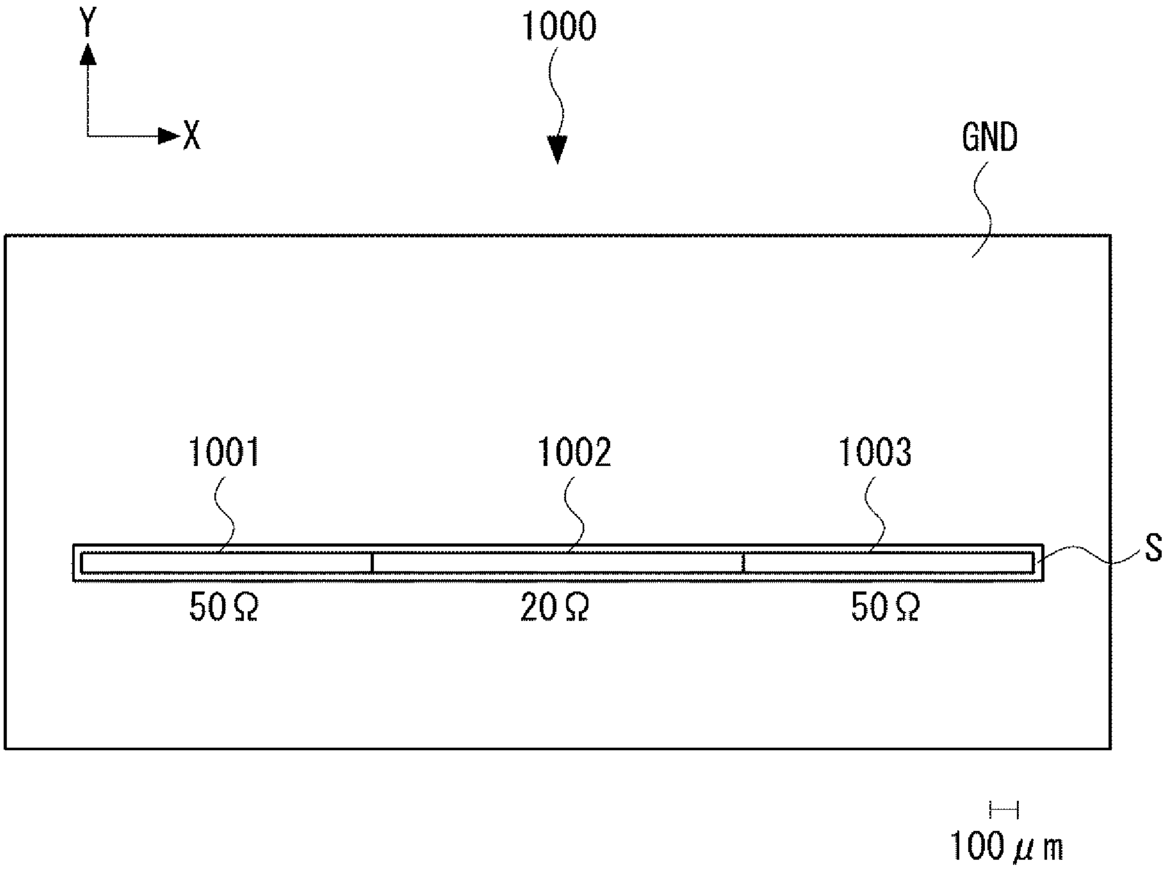
FIG. 1 schematically shows a configuration of a stepped impedance resonator including a coplanar waveguide.

Embodiments of the present invention will now be described with reference to the drawings. In each drawing, the same elements are assigned the same reference numerals, and duplicate descriptions may be omitted as necessary.

First Example Embodiment

As a premise for understanding a resonator having a filter function according to a first example embodiment, a resonator including a linear coplanar waveguide (it is also referred to as CPW), a resonator including a meander waveguide, and a resonator including a fishbone waveguide will be described.

First, a stepped impedance resonator (Hereinafter, SIR) including CPWs will be described. FIG. 1 schematically shows a configuration of a stepped impedance resonator (SIR) 1000 including CPWs and having a resonance frequency of 20 GHz.

Hereinafter, in the drawings, a direction from left to right on the paper is an X direction, and a direction from bottom to top is a Y direction. The X direction is also referred to as a first direction and the Y direction is also referred to as a second direction.

The SIR functions as a filter that selectively transmits an AC component in a band of its resonance frequency and a DC component. The characteristic impedance of the CPW is generally set to 50Ω, which is a reference value. However, a SIR can be configured by providing a section having a characteristic impedance different from the reference value. In the present example, the SIR 1000 is configured in such a manner that a CPW 1002 having a resonance frequency of 20 GHz and a characteristic impedance of 20Ω is inserted between a CPW1001 and a CPW1003 each having a characteristic impedance of 50Ω that is the reference value.

In the present example, the SIR 1000 is formed on a non-conductive substrate S, for example. A ground conductor GND connected to the ground and insulated from the SIR 1000 is formed around the SIR 1000. In FIG. 1, the SIR 1000 is insulated from the ground conductor by a gap, and the substrate S is exposed through the gap.

However, as described above, the SIR 1000 has a disadvantage that linear waveguides are connected in one direction, so that a dimension thereof in a length direction (X direction in FIG. 1) increases, and as a result, a footprint increases.

Figure 2:
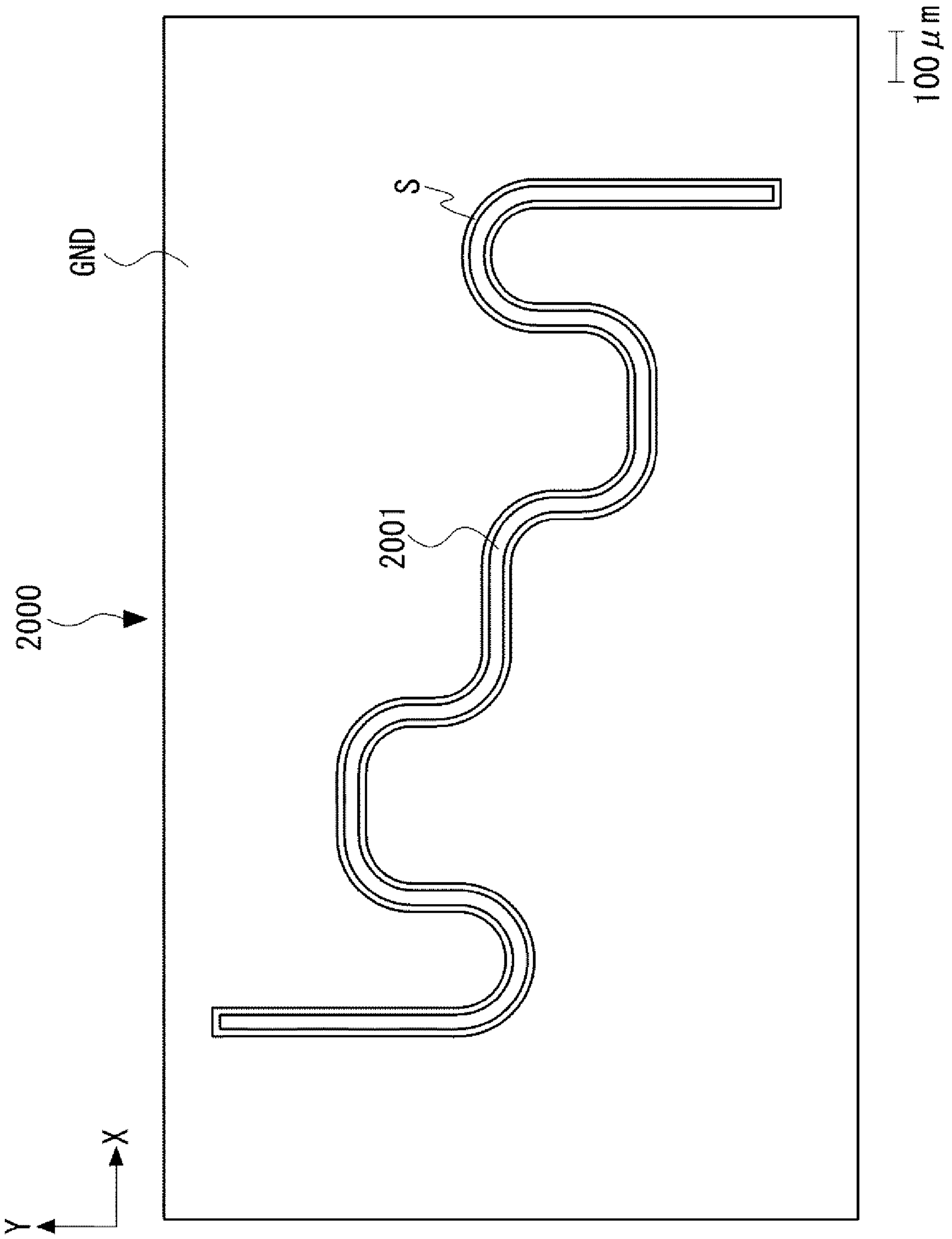
FIG. 2 schematically shows a configuration of a resonator including a meander waveguide.

On the other hand, to increase a degree of freedom in chip shape and pattern design, a waveguide formed by curving a part of a CPW at a predetermined curvature, so-called meander waveguide (e.g., Japanese Unexamined Patent Application Publication No. 2022-111146), has been widely introduced. FIG. 2 schematically shows a configuration of a resonator 2000 with a resonance frequency of 10 GHz including a meander waveguide. In the resonator 2000, by curving a waveguide 2001 at a predetermined curvature, a footprint can be reduced and integration can be improved as compared with the case of the resonator (e.g., SIR 1000 of FIG. 1) including the linear waveguide.

As in the case of the SIR 1000, the resonator 2000 is formed on the substrate S, and the ground conductor GND connected to the ground and insulated from the resonator 2000 is formed around the resonator 2000. Accordingly, the resonator 2000 is insulated from the ground conductor by a gap, and the substrate S is exposed through the gap.

However, when the waveguides are curved multiple times, or when the adjacent waveguides are arranged in parallel in a long range, there is a risk of generating a resonance mode different from a desired resonance mode, and the design becomes difficult.

Figure 3:
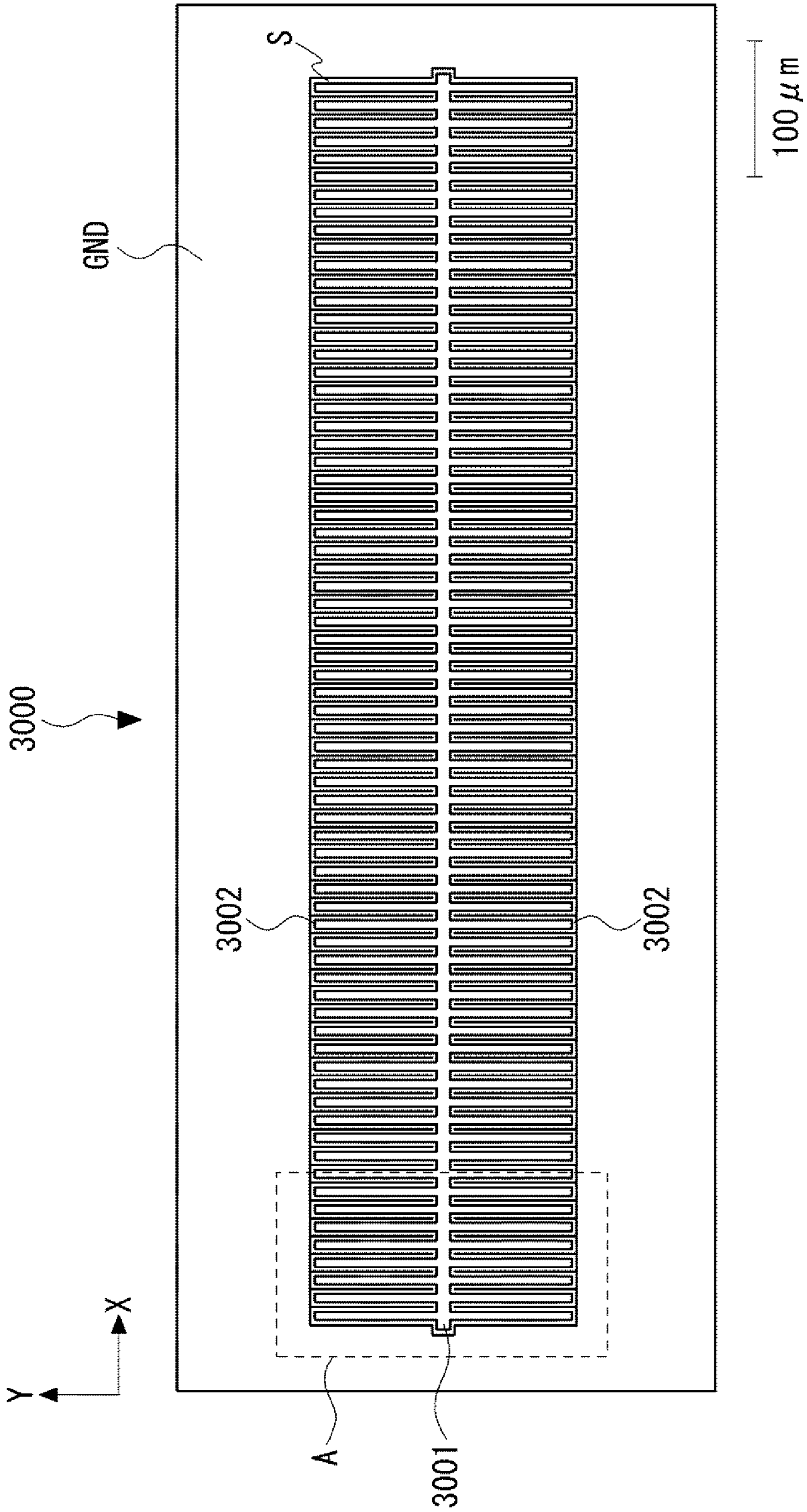
FIG. 3 schematically shows a configuration of a resonator including a fishbone waveguide.

Introducing a fishbone waveguide is also known as a technique to reduce the footprint of the resonator (Japanese Unexamined Patent Application Publication No. 2005-294382 and K. Nakagawa et al., "Transmission properties of fishbone-type superconducting transmission lines," Oct. 22, 2020, Japanese Journal of Applied Physics, Vol. 59, No. 11, 110904). FIG. 3 schematically shows a configuration of a resonator 3000 with a resonance frequency of 10 GHz including a fishbone waveguide. The resonator 3000 including the fishbone waveguide has a configuration in which a plurality of short waveguide structures 3002 (each called as a stub) extend in a direction (+Y direction and −Y direction of FIG. 3) orthogonal to a linear waveguide 3001 that extends in the X direction of FIG. 3.

As in the cases of the SIR 1000 and the resonator 2000, the resonator 3000 is formed on the substrate S, and the ground conductor GND connected to the ground and insulated from the resonator 3000 is formed around the resonator 3000. Therefore, the resonator 3000 is insulated from the ground conductor by a gap, and the substrate S is exposed through the gap.

Figure 4:
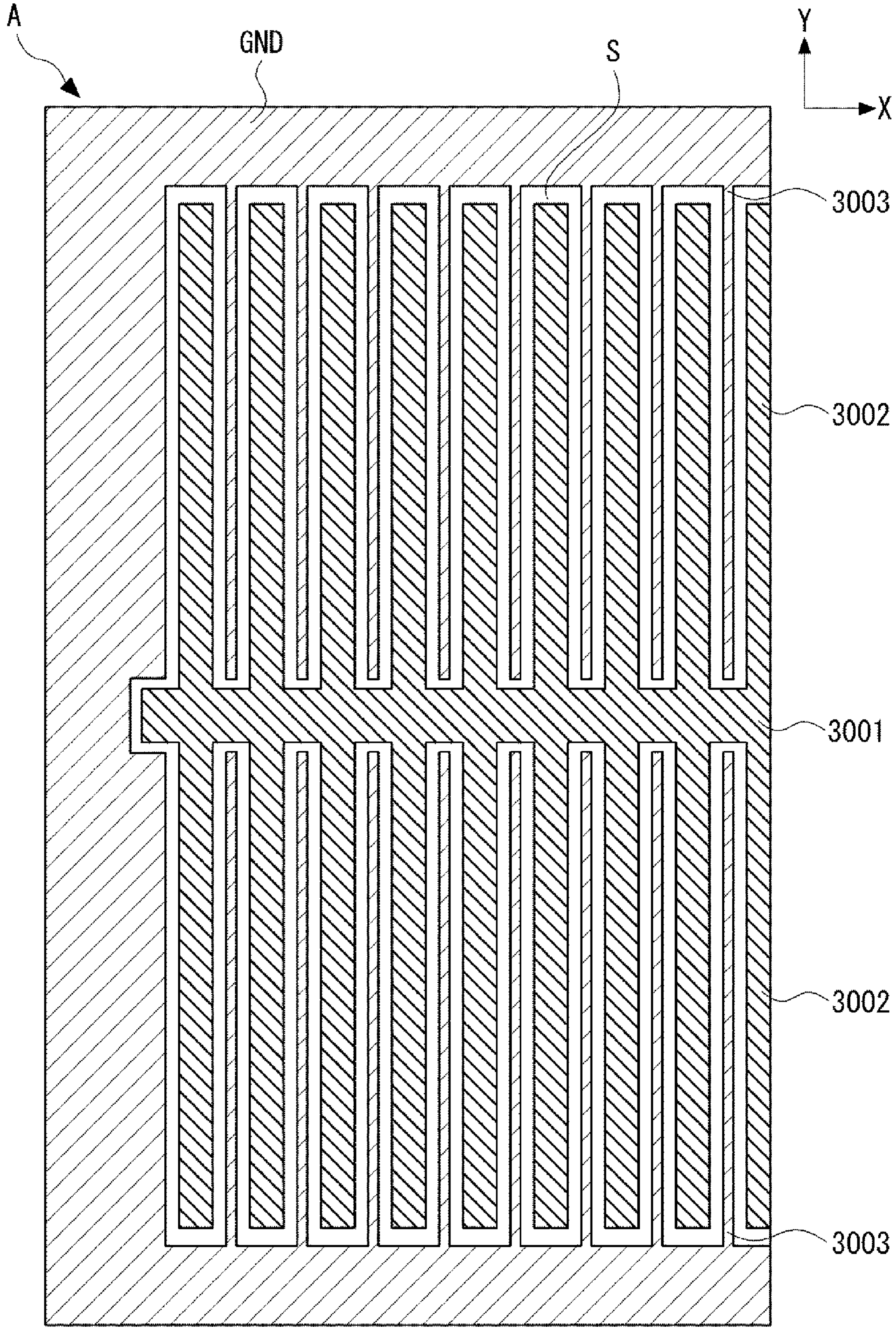
FIG. 4 is an enlarged view of an area A of the resonator shown in FIG. 3.

FIG. 4 shows an enlarged view of an area A of the resonator 3000 shown in FIG. 3. In the resonator 3000, the ground conductor GND extends in the Y direction between two adjacent stubs 3002. In FIG. 4, the ground conductor GND between the two adjacent stubs 3002 is indicated by a reference numeral 3003.

In the resonator 3000, a characteristic impedance and a phase velocity of the resonator 3000 can be arbitrarily adjusted by changing dimensions of the stubs 3002 and spacing therebetween in the X direction. In the resonator 3000 shown in FIG. 3, a length of the stubs 3002 is 90 μm and the characteristic impedance thereof is about 30Ω.

Since capacitance and inductance per unit length of the resonator 3000 are increased by the stubs, the phase velocity is slowed down. Thus, since an effective wavelength of the resonator 3000 can be shortened as compared with the case where the resonator includes the waveguide without stubs that has the same characteristic impedance (e.g., SIR 1000 of FIG. 1), the length of the resonator 3000 (dimension in X direction) can be shortened.

Figure 5:
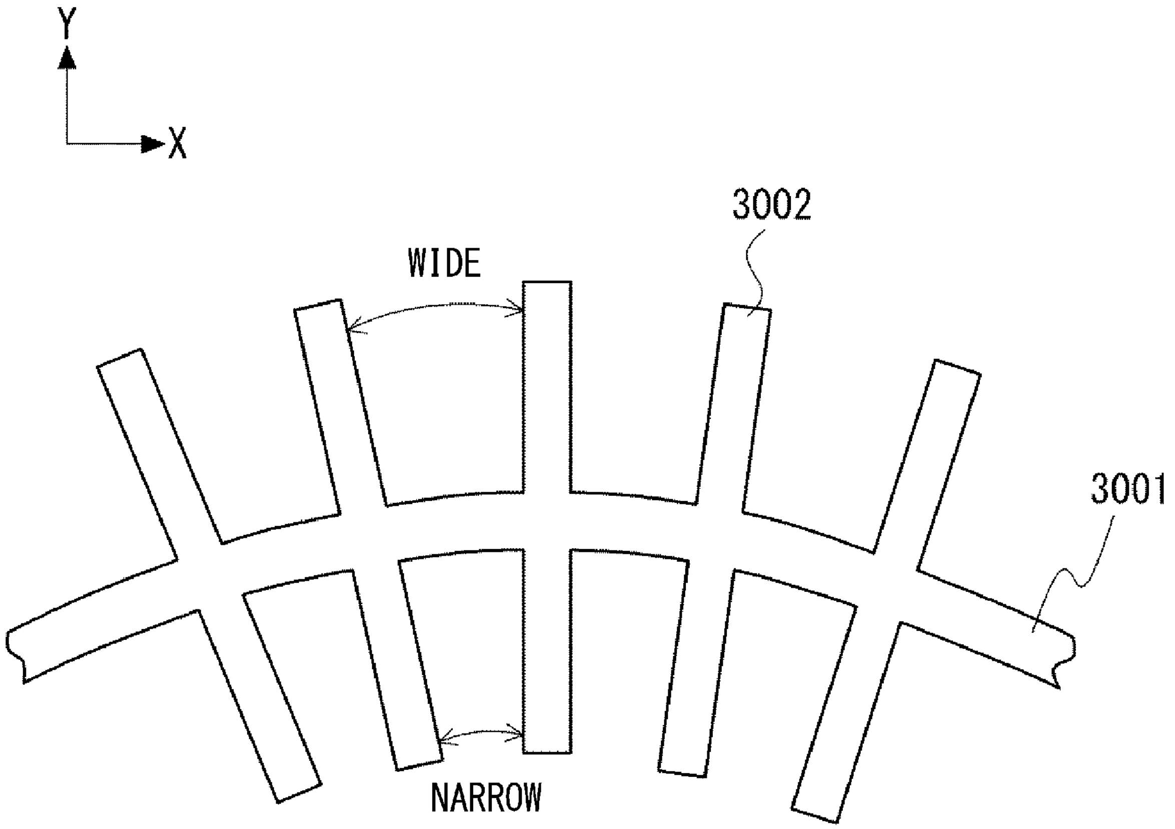
FIG. 5 schematically shows a fishbone waveguide when curved at a predetermined curvature.

To further shorten the dimension in the X direction of the resonator 3000 including the fishbone waveguide, it is conceivable that the fishbone waveguide is curved at the predetermined curvature as in the resonator 2000 including the meander waveguide shown in FIG. 2. FIG. 5 schematically shows a fishbone waveguide when curved at a predetermined curvature. In FIG. 5, the ground conductor GND is omitted for the purpose of simplification of the drawing. When the fishbone waveguide is curved, a distance between the stubs protruding toward the center of curvature is narrowed, and a distance between the stubs protruding in the opposite direction is widened. As a result, the characteristics of the resonator may change, and it is generally difficult to curve the fishbone waveguide.

To solve the above-mentioned disadvantages of the resonator, a SIR capable of efficiently reducing the footprint will be described in the present example embodiment. In the following, the ground conductor GND is formed around the resonator in the same manner as described above. The ground conductor GND between the two adjacent stubs of the fishbone waveguide is omitted for the purpose of simplification of the drawings.

Figure 6:
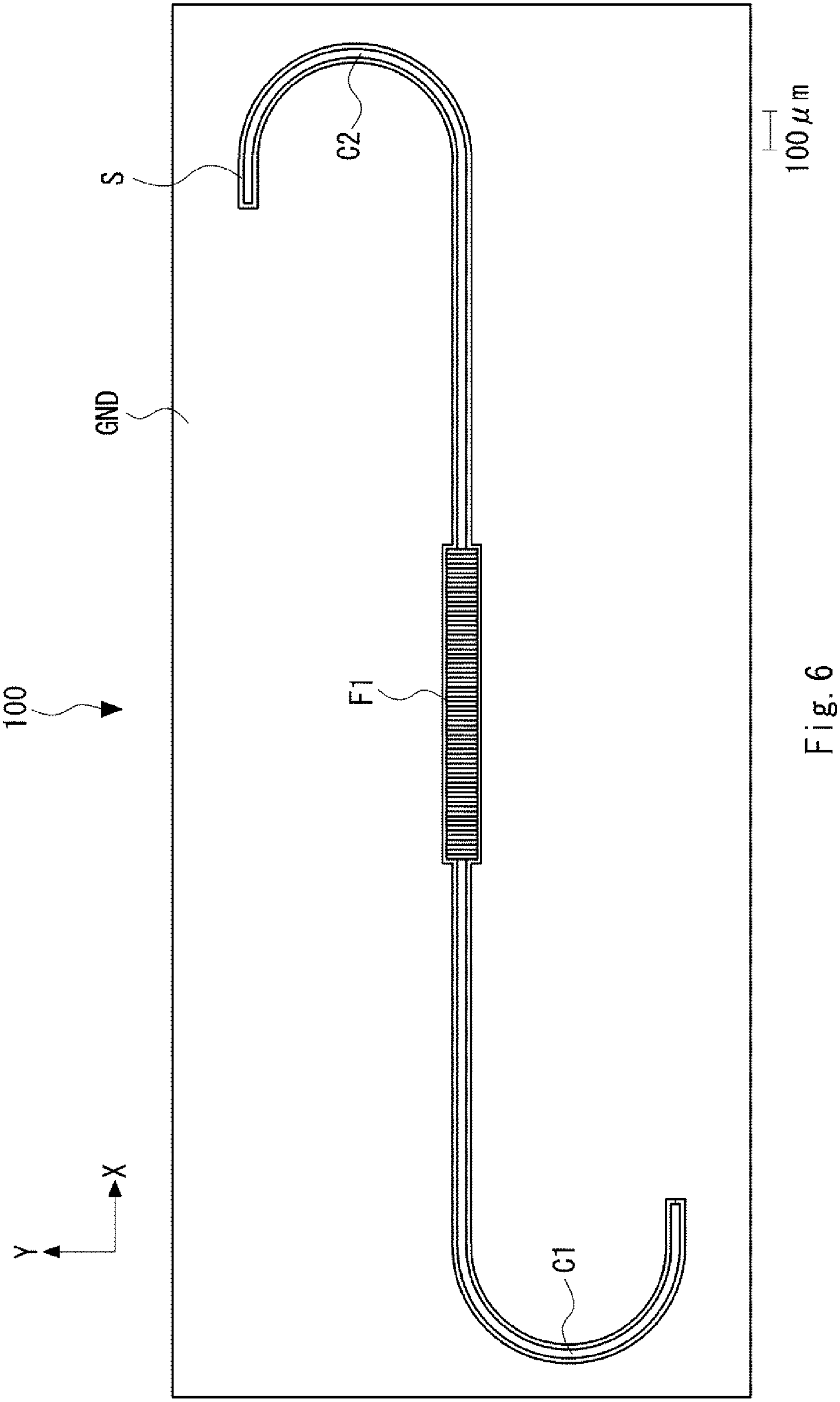
FIG. 6 schematically shows a configuration of a stepped impedance resonator according to a first example embodiment.

FIG. 6 schematically shows a configuration of a stepped impedance resonator (SIR) 100 according to the first example embodiment. The SIR 100 has a configuration in which one fishbone waveguide F1 having a longitudinal direction in the X direction is inserted between two curved waveguides C1 and C2 that are curved CPWs. The curved waveguides C1 and C2 are also referred to as first and second curved waveguides, respectively.

The curved waveguides C1 and C2 are configured as U-shaped CPWs. The present example represents the curved waveguides C1 and C2 are curved in opposite directions. In other words, the curved waveguide C1 is curved toward the −Y side, the curved waveguide C2 is curved toward the +Y side. More specifically, the curved waveguide C1 protrudes in the −X direction from the −X end of the fishbone waveguide F1, and is then curved counterclockwise to form a U-shape extending in the +X direction. The curved waveguide C2 protrudes in the +X direction from the +X end of the fishbone waveguide F1, and is then curved counterclockwise to form a U-shape extending in the −X direction.

Note that the curved waveguides C1 and C2 are only illustrative examples, and may be curved in the same direction, i.e., toward the +Y side or the −Y side.

Furthermore, the curved waveguides C1 and C2 are only illustrative examples, and linear coplanar waveguides may be adopted instead of the curved waveguides C1 and C2, respectively.

Next, a filter function of the SIR 100 will be discussed. In the present configuration, the characteristic impedance of the curved waveguides C1 and C2 is 50Ω that is the reference value. The characteristic impedance of the fishbone waveguide F1 is a value different from the reference value of 50Ω, for example, 20Ω. In this way, the characteristic impedance of the curved waveguides directly connected to a port is set to the reference value, and the characteristic impedance of a part sandwiched between the curved waveguides is matched to a value different from the reference value, so that the SIR can be configured. Thus, a stepped impedance resonator is configured by the whole of the SIR 100.

To enhance the filter function, a larger difference between the characteristic impedance of the fishbone waveguide F1 and the characteristic impedance of the curved waveguides C1 and C2 is preferable.

Hereinafter, the impedance of the fishbone waveguide forming the SIR is also referred to as a second impedance, and the impedance of the coplanar waveguide other than the fishbone waveguide is referred to as a first impedance.

The resonance frequency of the SIR 100 is determined by the length of the fishbone waveguide F1, the length and width of the stubs, the gap between the stubs, the width of a central conductor part, a width of the gap, and the like. The resonance frequency of the SIR 100 includes not only the resonance frequency of a fundamental mode with the lowest frequency but also resonance frequencies of higher-order modes. As a result, the SIR 100 mainly resonates at the resonance frequency of the fundamental mode and can function as a filter to prevent transmission of frequencies other than the resonance frequency.

The SIR 100 can be provided as a semiconductor chip in which, for example, the curved waveguides C1 and C2 and the fishbone waveguide F1 are monolithically fabricated on the same semiconductor substrate by a semiconductor process.

In the present configuration, since the fishbone waveguide F1 having the short dimension in the longitudinal direction (i.e., X direction in FIG. 6) is inserted between the two curved waveguides C1 and C2, the longitudinal dimension of the SIR 100 can be shortened as compared with the resonator including only the CPW. Therefore, the area occupied by the SIR 100, or the footprint of the SIR 100 can be reduced.

Thus, by removing or reducing the size constraint of the SIR 100, a degree of freedom in chip shape and pattern design can be improved.

Further, the present configuration can be applied to design patterns more diverse (not longer) than a simple fishbone waveguide.

Second Example Embodiment

The SIR 100 according to the first example embodiment has been described as one fishbone waveguide inserted between the two curved waveguides. However, it is only an example and a plurality of fishbone waveguides may be arranged. In other words, a resonator may be formed by alternately arranging N fishbone waveguides and N−1 linear waveguides that are CPWs between two curved waveguides, i.e., by arranging one linear waveguide between two adjacent fishbone waveguides. The following will be described in detail.

Figure 7:
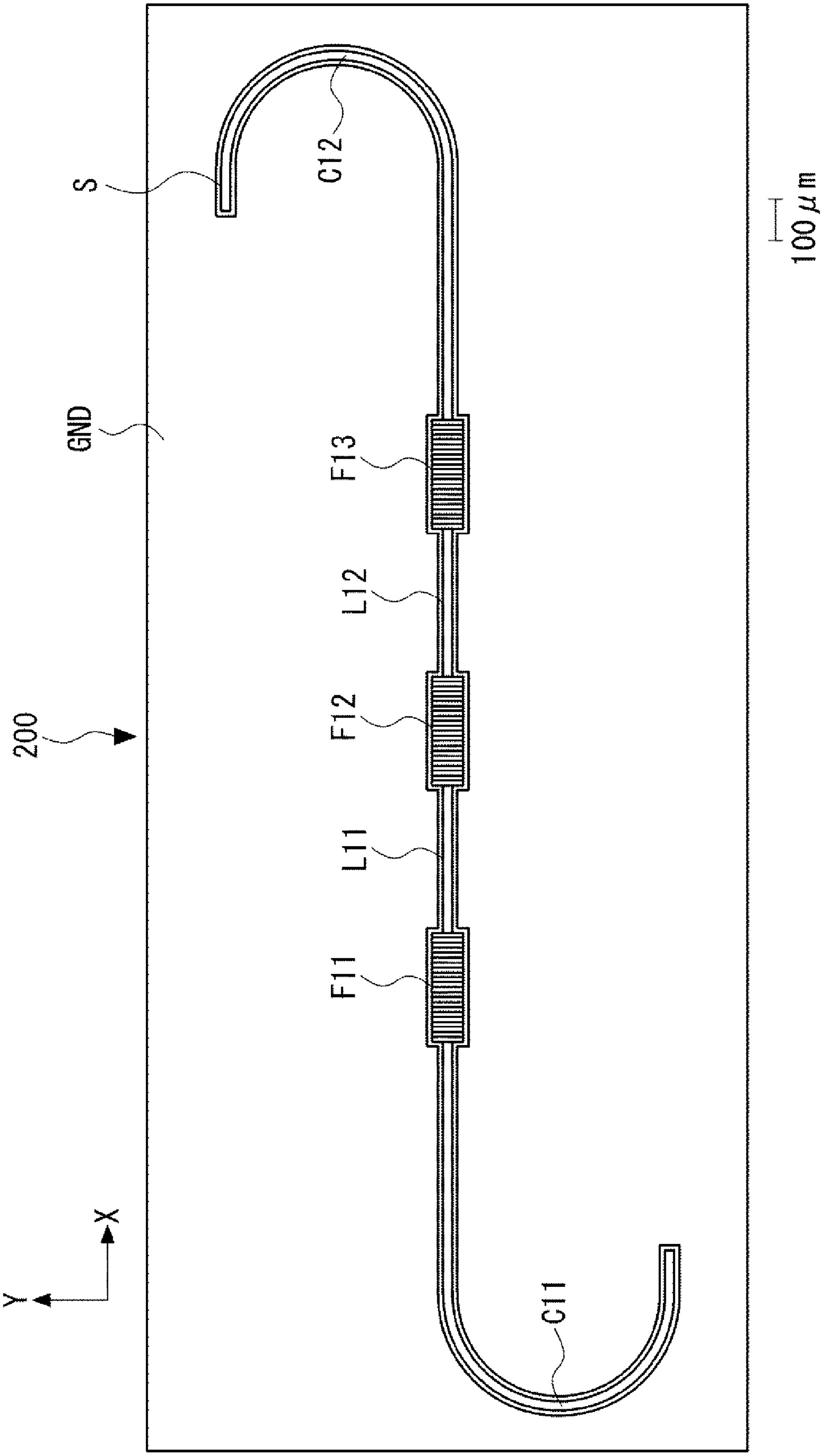
FIG. 7 schematically shows a configuration of a stepped impedance resonator according to a second example embodiment.

FIG. 7 schematically shows a configuration example of a SIR 200 according to a second example embodiment. The SIR 200 is a modified example of the SIR 100 according to the first example embodiment, and is provided with curved waveguides C11 and C12 corresponding to the curved waveguides C1 and C2 of the SIR 100. The fishbone waveguide F1 of the SIR 100 is replaced with a configuration in which three fishbone waveguides F11 to F13 and two linear waveguides L11 and L12 are alternately connected in the X direction.

More specifically, one end of the fishbone waveguide F11 is connected to the curved waveguide C11, and one end of the fishbone waveguide F13 is connected to the curved waveguide C12. The fishbone waveguides F11 and F12 are connected by the linear waveguide L11, and the fishbone waveguides F12 and F13 are connected by the linear waveguide L12. Hereinafter, the fishbone waveguides F11 and F13 are also referred to as first and second fishbone waveguides, respectively. The linear waveguides L11 and L12 are also referred to as first and second coplanar waveguides, respectively.

In the present configuration, a stepped impedance resonator including the fishbone waveguides F11, F12, and F13, and the linear waveguides L11 and L12 can be configured by matching the impedance of the fishbone waveguides F11, F12, and F13, and the impedance of the linear waveguides L11 and L12.

When the characteristic impedance of the curved waveguides C11 and C12 is 50Ω that is the reference value, for example, the SIR can be configured by matching the characteristic impedance of the fishbone waveguides F11, F12, and F13, and the linear waveguides L11 and L12 to 20Ω.

That is, the characteristic impedance of the curved waveguide directly connected to a port is set to the reference value, and the characteristic impedance of a part sandwiched between the curved waveguides is matched to the same value different from the reference value, so that the SIR can be configured in the same manner as the SIR 100 in FIG. 6.

Similar to the SIR 200, the resonance frequency of the SIR having a part including a plurality of the fishbone waveguides and the waveguides connecting them is determined by the resonance frequency of each waveguide. Here, the resonance frequency of each section is the frequency at which the wavelength is two times of the length of the section. Here, N is defined as an integer of two or more, the number of the fishbone waveguides is defined as N, the number of waveguides connected between them is defined as N−1, resonance frequencies of the fishbone waveguides are denoted as $f_{F1}$ to $f_{FN}$, and resonance frequencies of the connecting waveguides are denoted as $f_{W1}$ to $f_{WN-1}$. In this case, the resonance frequency f of the fundamental mode of the entire SIR is expressed by the following expression.

$$f = \frac{1}{\sum_{i=1}^{N} \frac{1}{f_{Fi}} + \sum_{i=1}^{N-1} \frac{1}{f_{Wi}}} \quad [1]$$

The resonance frequency f of the fundamental mode of the entire SIR can be also expressed using the transit time of a signal in each section. The transit time of the section is defined as a value obtained by dividing the length of the section by a phase velocity of the section. Here, the transit times of the signals of a plurality of the fishbone waveguides are denoted as $T_{F1}$ to $T_{FN}$, respectively. The transit times of the signals of the connecting waveguides are denoted as $T_{A1}$ to $T_{AN-1}$, respectively. In this case, the resonance frequency f of the fundamental mode of the entire SIR is expressed by the following expression.

$$f = \frac{0.5}{\sum_{i=1}^{N} T_{Fi} + \sum_{i=1}^{N-1} T_{Ai}} \quad [2]$$

In the SIR 200, the five waveguide sections of the fishbone waveguides F11, F12, and F13, and the linear waveguides L11 and L12 are arranged in a section between the curved waveguides C11 and C12. Here, the resonance frequencies of the fishbone waveguides F11, F12, and F13 are denoted as $f_{F11}$, $f_{F12}$, and $f_{F13}$, respectively. The resonance frequencies of the linear waveguides L11 and L12 are denoted as $f_{L11}$ and $f_{L12}$, respectively. In this case, the resonance frequency f of the fundamental mode of the entire SIR 200 is expressed by the following expression.

$$f = \frac{1}{\frac{1}{f_{F11}} + \frac{1}{f_{F12}} + \frac{1}{f_{F13}} + \frac{1}{f_{L11}} + \frac{1}{f_{L12}}} \quad [3]$$

The transit times of the fishbone waveguides F11, F12, and F13 are denoted as $T_{F11}$, $T_{F12}$, and $T_{F13}$. The transit times of the linear waveguides L11 and L12 are denoted as $T_{L11}$ and $T_{L12}$. In this case, the resonance frequency f of the fundamental mode of the entire SIR 200 is expressed by the following expression.

$$f = \frac{0.5}{T_{F11} + T_{F12} + T_{F13} + T_{L11} + T_{L12}} \quad [4]$$

Therefore, in the present configuration as well, by using the fishbone waveguide, the longitudinal dimension of the SIR 200 can be shortened as compared with the resonator including only the CPWs. Thus, the footprint of the SIR 200 can be reduced and the size constraint of the SIR 200 can be removed or reduced. Therefore, a degree of freedom of chip shape and pattern design can be improved.

The SIR 200 can be regarded as a divided arrangement of the fishbone waveguide as compared with the SIR 100 according to the first example embodiment. Thus, a degree of freedom in the arrangement of the SIR 200 can be increased. For example, if there is a component or the like that interferes with the installation position of the SIR 200, it is possible to arrange the linear waveguide that is the CPW instead of the fishbone waveguide at the interfering position.

Figure 8:
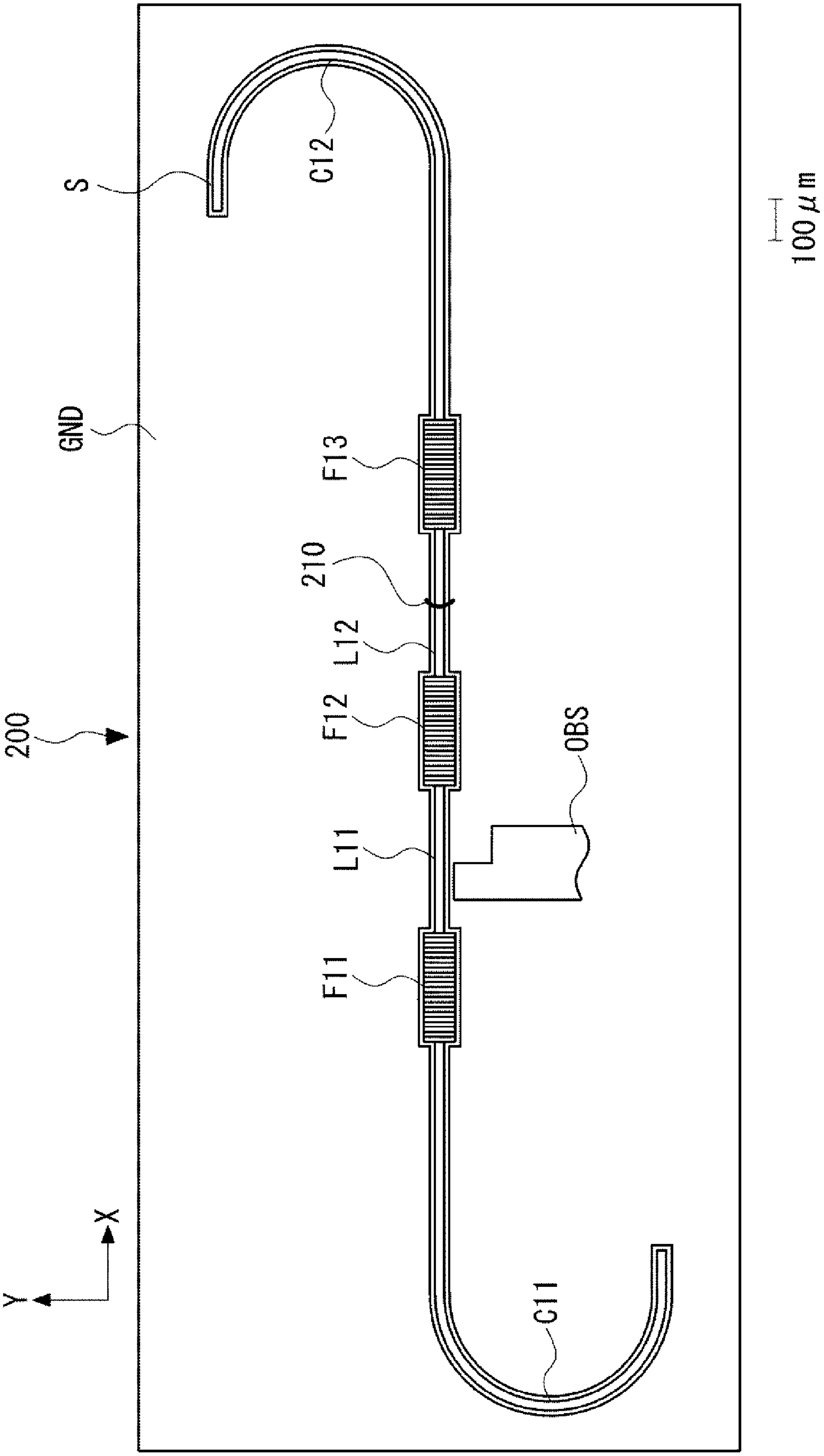
FIG. 8 shows a layout of a stepped impedance resonator capable of avoiding interference caused by obstacles.

FIG. 8 shows a layout of the SIR 200 that can avoid interference caused by obstacles. In this example, the obstacle OBS protrudes toward the SIR 200 along the Y direction orthogonal to the X direction that is the longitudinal direction of the SIR 200. Therefore, the SIR 200 may be arranged so that the obstacle OBS does not interfere with the fishbone waveguide that is wide in the Y direction. Specifically, by arranging the linear waveguide on the extension line of the obstacle OBS in the Y direction, the SIR 200 may be arranged not to interfere with the obstacle OBS without being widely shifted in the Y direction.

In the present configuration, the substrate surface, i.e., the ground surface, on which the SIR 200 is formed is partly separated by the CPW sandwiched between the fishbone waveguides. To equalize potential in the separated parts, an air bridge 210 may be formed as shown in FIG. 8. An air bridge is a structure that electrically connects ground surfaces separated by a waveguide configured by forming an aerial bridging structure that straddles the waveguide by a conductor such as a superconductor and is electrically insulated from the waveguide. The effectiveness of the air bridge is described, for example, in Japanese Patent Nos. 6437607 and 6749382. By providing the air bridge, the resonance frequencies other than the desired mode can be suppressed. However, the connection structure is not limited to the air bridge, and various conductors that electrically connect the ground surfaces can be adopted. In this case, the air bridge 210 is preferably as short as possible to ensure the mechanical strength of the aerial bridging structure. For example, the air bridge 210 is preferably shorter than the length of the stub of the fishbone waveguides F11 to F13, i.e., the width in the Y direction of the fishbone waveguides F11 to F13.

It is also possible to further reduce the footprint of the SIR by curving a part of the CPWs of the SIR 200.

Figure 9:
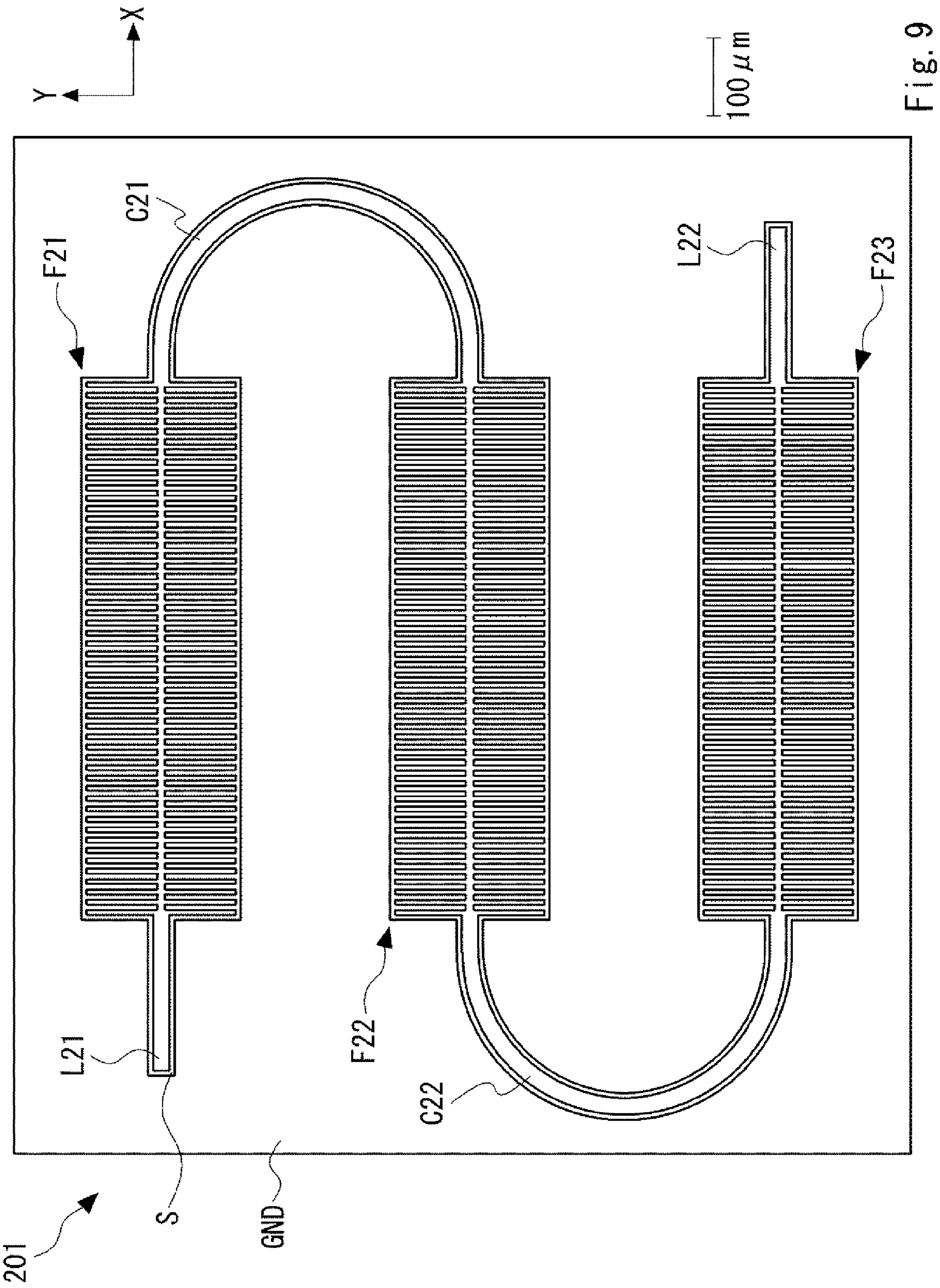
FIG. 9 schematically shows a configuration of a modified example of the stepped impedance resonator according to the second example embodiment.

FIG. 9 schematically shows a configuration of a SIR 201 that is a modified example of the SIR 200 according to the second example embodiment. In the present example, the SIR 201 is provided with fishbone waveguides F21 to F23 respectively corresponding to the fishbone waveguides F11 to F13 of the SIR 200. In the SIR 201, linear waveguides L21 and L22 that are the CPWs are provided instead of the curved waveguides C11 and C12 of the SIR 200, respectively. U-shaped curved waveguides C21 and C22 that are the CPWs are provided instead of the linear waveguides L11 and L12 of the SIR 200, respectively.

Although the curved waveguides C21 and C22 are configured as the U-shaped CPWs, it is preferable that the curved waveguides C21 and C22 are curved at a gentle curvature so as not to interfere with impedance matching. In the present example, the curved waveguides C21 and C22 are curved in opposite directions. That is, the curved waveguide C21 is curved so that the center of curvature is on the −X side, and the curved waveguide C22 is curved so that the center of curvature is on the +X side.

More specifically, the curved waveguide C21 extends in the +X direction from the +X end of the fishbone waveguide F22 whose longitudinal direction is the X direction, extends in the +Y direction and then extends in the −X direction by being curved counterclockwise, and is connected to the +X end of the fishbone waveguide F21 whose longitudinal direction is the X direction. The curved waveguide C22 extends in the −X direction from the −X end of the fishbone waveguide F22, extends in the −Y direction and then extends in the +X direction by being curved counterclockwise, and is connected to the −X end of the fishbone waveguide F23 whose longitudinal direction is the X direction.

The linear waveguide L21 extends in the −X direction from the −X end of the fishbone waveguide F21. The linear waveguide L22 extends in the +X direction from the +X end of the fishbone waveguide F23.

Next, the design of the SIR 201 will be described. Here, the characteristic impedance of the linear waveguides L21 and L22 is defined as Z0. The characteristic impedance of a section sandwiched between the linear waveguides L21 and L22, that is, the fishbone waveguides F21, F22, and F23, and the curved waveguides C21 and C22, is defined as Z1. To realize a SIR in the present configuration, Z0 and Z1 are set as different values.

Similar to the above-described example embodiment, a difference between the characteristic impedance Z0 and the characteristic impedance Z1 of the fishbone waveguides F21, F22, and F23 and the curved waveguides C21 and C22 is preferably larger. For example, the difference is preferably 20Ω or more and more preferably 30Ω or more. Therefore, in the present example embodiment, the characteristic impedance Z0 of the linear waveguides L21 and L22 is set to 50Ω that is the reference value, and the characteristic impedance Z1 of the fishbone waveguides F21, F22, and F23, and the curved waveguides C21 and C22 is set to 20Ω. However, the value of the characteristic impedance is not limited to this example, and may be arbitrary values as long as they are different values.

The resonance frequency of the SIR 201 is determined by the above-mentioned Expressions [1] and [2]. Here, the resonance frequencies of the fishbone waveguides F21, F22, and F23 are denoted as $f_{F21}$, $f_{F22}$, and $f_{F23}$, respectively. The resonance frequencies of the curved waveguides C21 and C22 are denoted as $f_{C21}$ and $f_{C22}$, respectively. In this case, according to Expression [1], the resonance frequency f of the fundamental mode of the entire SIR 201 is expressed by the following expression.

$$f=\frac{1}{\frac{1}{f_{F21}}+\frac{1}{f_{F22}}+\frac{1}{f_{F23}}+\frac{1}{f_{C21}}+\frac{1}{f_{C22}}} \quad [5]$$

The transit times of signals in the fishbone waveguides F21, F22, and F23 are denoted as $T_{F21}$, $T_{F22}$, and $T_{F23}$, respectively. The transit times of signals in the curved waveguides C21 and C22 are $T_{C21}$ and $T_{C22}$, respectively. In this case, according to Expression [2], the resonance frequency f of the fundamental mode of the entire SIR 201 is expressed by the following expression.

$$f=\frac{0.5}{T_{F21}+T_{F22}+T_{F23}+T_{C21}+T_{C22}} \quad [6]$$

Although the resonance frequency of the fundamental mode has been described here for the purpose of simplification of explanation, the resonance frequency of the SIR 201 includes not only the resonance frequency of the fundamental mode with the lowest frequency but also the resonance frequencies of the higher-order modes. The descriptions of the resonance frequencies of the higher-order modes will be omitted.

According to the present configuration, the fishbone waveguides F21 to F23 can be arranged in parallel in the Y direction, and it is possible to cause an area occupied by the SIR 201 to be close to a square shape. As a result, the footprint of the SIR 201 can be reduced as compared with that of the SIR 200. Therefore, the SIR 201 can be arranged more easily as compared with the SIR 200 in an environment where the dimension of one direction is limited.

Figure 10:
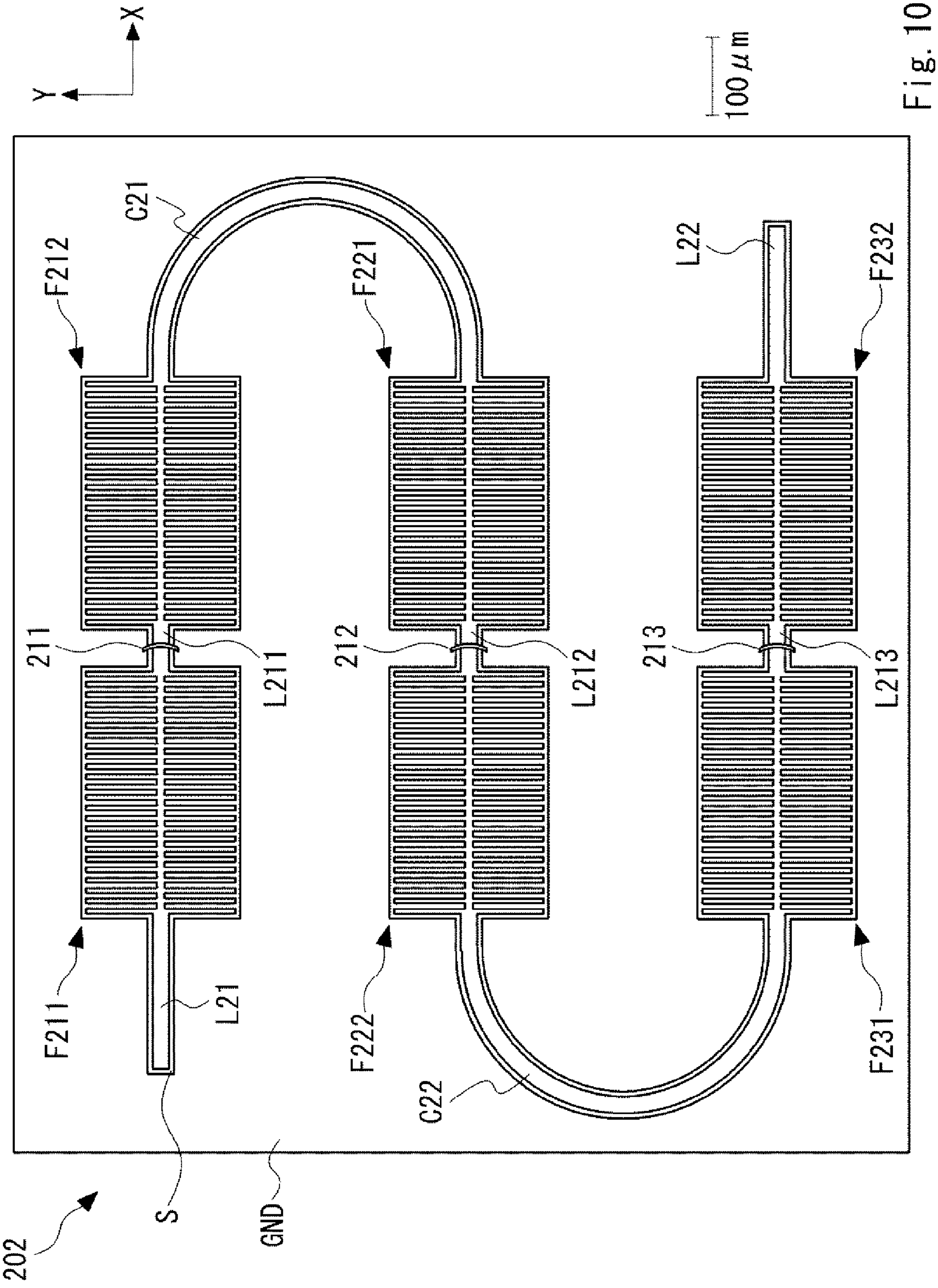
FIG. 10 schematically shows a configuration of a modified example of the stepped impedance resonator shown in FIG. 9.

In the SIR 201 of FIG. 9, as in the case of FIG. 8, one fishbone waveguide can be divided into a plurality of parts to increase the degree of freedom of the layout. The air bridge can be also provided. FIG. 10 schematically shows a configuration of a SIR 202 that is a modified example of the SIR 201 in FIG. 9.

In the SIR 202, a plurality of fishbone waveguides and one or more linear waveguides connecting each pair of two adjacent fishbone waveguides are arranged in the section where each of the fishbone waveguides F21 to F23 of the SIR 201 are arranged. Specifically, in the SIR 202, fishbone waveguides F211 and F212 are provided instead of the fishbone waveguide F21 of the SIR 201, and the fishbone waveguides F211 and F212 are connected by a linear waveguide L211. Fishbone waveguides F221 and F222 are provided instead of the fishbone waveguide F22 of the SIR 201, and the fishbone waveguides F221 and F222 are connected by a linear waveguide L212. Fishbone waveguides F231 and F232 are provided instead of the fishbone waveguide F23 of the SIR 201, and the fishbone waveguides F231 and F232 are connected by a linear waveguide L213.

Here, the characteristic impedance of the linear waveguides L21 and L22 is defined as Z0. The characteristic impedance of a section sandwiched by the linear waveguides L21 and L22, that is, the fishbone waveguides F211, F212, F221, F222, F231, and F232, the curved waveguides C21 and C22, and the linear waveguides L211 to L213 is defined as Z1. Since the relationship between Z0 and Z1 is the same as that of the SIR 201, the redundant description thereof will be omitted.

The resonance frequency of the SIR 202 is determined by the above-mentioned Expressions [1] and [2]. Here, the resonance frequencies of the fishbone waveguides F211, F212, F221, F222, F231, and F232 are denoted as $f_{F211}$, $f_{F212}$, $f_{F221}$, $f_{F222}$, $f_{F231}$, and $f_{F232}$, respectively. The resonance frequencies of the linear waveguides L211 to L213 are denoted as $f_{L211}$ to $f_{L213}$, respectively. In this case, the resonance frequency f of the fundamental mode of the entire SIR 202 is expressed by the following expressions.

$$f=\frac{1}{f_F^{-1}+f_C^{-1}+f_L^{-1}} \quad [7]$$

$$f_F^{-1}=\frac{1}{f_{F211}}+\frac{1}{f_{F212}}+\frac{1}{f_{F221}}+\frac{1}{f_{F222}}+\frac{1}{f_{F231}}+\frac{1}{f_{F232}} \quad [8]$$

$$f_C^{-1}=\frac{1}{f_{C21}}+\frac{1}{f_{C22}} \quad [9]$$

$$f_L^{-1}=\frac{1}{f_{L211}}+\frac{1}{f_{L212}}+\frac{1}{f_{L213}} \quad [10]$$

The transit times of signals in the fishbone waveguides F211, F212, F221, F222, F231, and F232 are denoted as $T_{F211}$, $T_{F212}$, $T_{F221}$, $T_{F222}$, $T_{F231}$, and $T_{F232}$, respectively. The transit times of signals in the linear waveguides L211 to L213 are denoted as $T_{L211}$ to $T_{L213}$, respectively. In this case, the resonance frequency f of the fundamental mode of the entire SIR 202 is expressed by the following expressions.

$$f=\frac{0.5}{T_F+T_C+T_L} \quad [11]$$

$$T_F=T_{F211}+T_{F212}+T_{F221}+T_{F222}+T_{F231}+T_{F232} \quad [12]$$

$$T_C=T_{C21}+T_{C22} \quad [13]$$

$$T_L=T_{L211}+T_{L212}+T_{L213} \quad [14]$$

Although the resonance frequency of the fundamental mode has been described here for the purpose of simplicity, the resonance frequency of the SIR 202 includes not only the resonance frequency of the fundamental mode with the lowest frequency but also the resonance frequencies of the higher-order modes. The description of the resonance frequencies of the higher-order modes will be omitted.

In addition, the ground conductors at both ends of the linear waveguides L211 to L213 are electrically connected by air bridges 211 to 213, respectively. Thus, even if the ground conductors are separated by the waveguide, the potential of the ground conductors can be equalized by forming the air bridges.

Third Example Embodiment

A frequency-tunable resonator according to a third example embodiment will be described. The frequency-tunable resonator is configured as a superconducting quantum circuit used in a quantum information processing circuit using superconductivity, for example, a quantum circuit for generating a quantum bit, a parametric amplifier that is a kind of amplifier, and the like.

Figure 11:
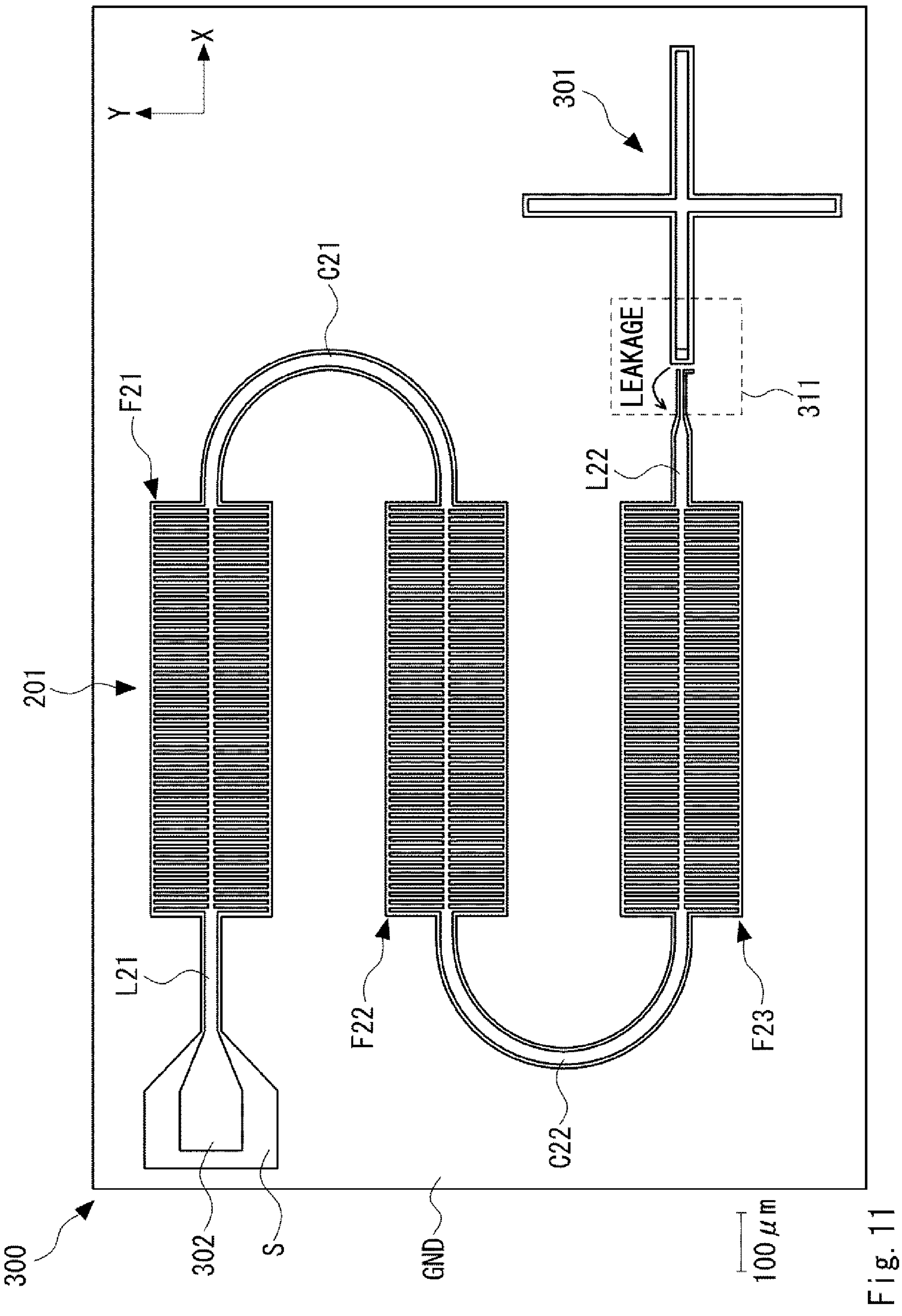
FIG. 11 schematically shows a configuration of a frequency-tunable resonator according to a third example embodiment.

FIG. 11 schematically shows a configuration of a frequency-tunable resonator 300 according to the third example embodiment. The frequency-tunable resonator 300 includes a resonator 301 and a control line. The resonator 301 is also referred to as an external resonator.

The resonator 301 is configured to oscillate at a frequency in response to a control signal CON provided from the outside to a control port 302 and input to the resonator 301 through the control line. As long as the resonator 301 can oscillate at the frequency in response to the control signal CON, resonators of various configurations can be used.

The SIRs described in the above-described example embodiments are used as the control line. Here, an example in which the SIR 201 according to the second example embodiment is used as the control line will be described.

The linear waveguide L21 is connected to the control port 302. The linear waveguide L22 extends toward a position adjacent to the resonator 301 and is narrowed at an end. The narrowed end is magnetically coupled to the resonator 301 by a magnetic coupling structure 311.

Figure 12:
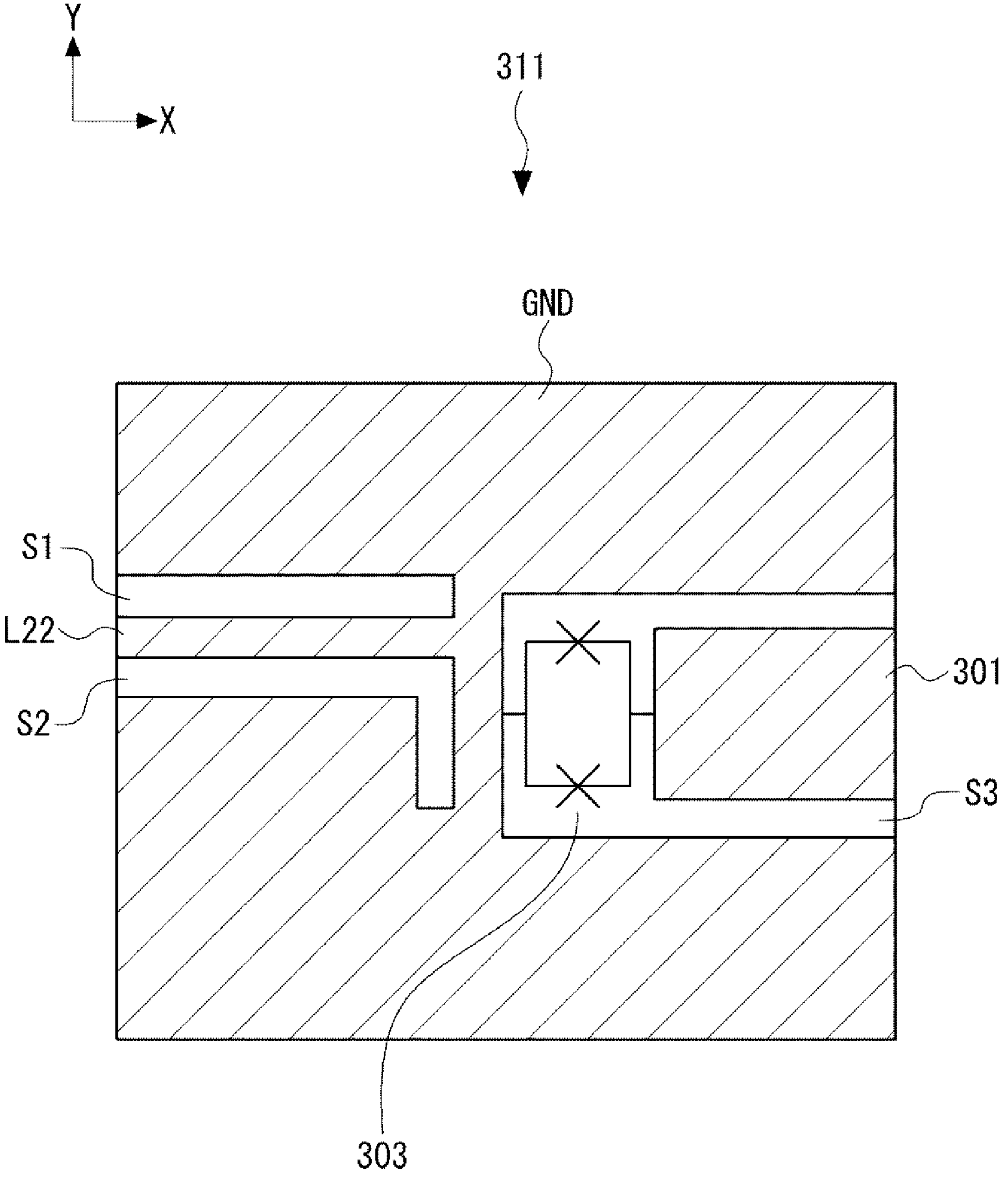
FIG. 12 is an enlarged view of a magnetic coupling structure shown in FIG. 11.

FIG. 12 shows an enlarged view of the magnetic coupling structure 311. In FIG. 12, conductor parts are hatched for ease of understanding. The linear waveguide L22 is provided at a position shifted in the +Y direction with respect to the end of the resonator 301, and the end thereof is connected to the ground conductor GND. On the +Y side of the linear waveguide L22, the conductor of an area extending in the X direction is removed as indicated by a reference numeral S1, and the substrate is exposed. On the −Y side of the linear waveguide L22, the conductor of an area extending in the X direction is removed as indicated by a reference numeral S2, and the substrate is exposed. However, the resonator 301 side end of the area indicated by the reference numeral S2 is curved in the −Y direction and extends a predetermined length in the −Y direction.

As indicated by a reference numeral S3, the conductor around the resonator 301 is removed and the substrate is exposed. A superconducting quantum interference device (SQUID) 303 is provided at the −X end of the conductor of the resonator 301. The SQUID 303 magnetically couples the linear waveguide L22 to the resonator 301.

Since the other configuration of the SIR 201 is the same as that of the second example embodiment, a redundant description will be omitted.

The frequency-tunable resonator 300 can be provided as a semiconductor chip in which, for example, the resonator 301 and the SIR 201 included in the control line are monolithically fabricated on the same semiconductor substrate by the semiconductor process.

The control port 302 is connected, for example, to an electronic circuit that outputs the control signal CON via a connector (not shown) and a high-frequency cable. In this case, to suppress reflection loss of the high-frequency, it is preferable that the characteristic impedance of the high-frequency cable and the characteristic impedance of the SIR 201 that is the control line and connected to the control port 302 have the same value. Generally, the characteristic impedance of the high-frequency cable is often 50Q or 75Q. Therefore, in the present example embodiment, the characteristic impedance of the high-frequency cable is defined as 50Q. However, the value of the characteristic impedance of the high-frequency cable and the SIR 201 that is the control line is only an example and may be any value.

The SIR 201 that is the control line is configured such that the resonance frequency of the fundamental mode and the resonance frequencies of the higher-order modes are different from the resonance frequency f of the resonator 301. This allows the SIR 201 to function as a filter that reflects the resonance energy of the resonator 301 at the end of the fishbone waveguide F23.

Therefore, even if the resonator 301 oscillates and the signal with the resonance frequency f leaks outside the control line SIR 201, since the resonance frequency of the SIR 201 is different from the resonance frequency f of the resonator 301, the leaked signal is reflected by the SIR 201. Thus, transmission of the resonance energy of the resonator 301 to the control port 302 can be appropriately prevented.

Further, to cause the filter function of the SIR 201 to be more efficient, it is preferable to design the SIR 201 so that its transmittance is the lowest at the resonance frequency f of the resonator 301. In this case, the resonance frequency of the fundamental mode of the SIR 201 is preferably two times±10% of the resonance frequency f of the resonator 301, and most preferably two times. In other words, the resonance frequency of the SIR 201 is preferably 0.9 times or more of two times of the resonance frequency f of the resonator 301, and 1.1 times or less of two times of the resonance frequency f of the resonator 301, and most preferably two times.

Depending on the size of the control line, a resonance frequency different from the desired resonance frequency may appear in the frequency-tunable resonator 300. To prevent such a phenomenon, it is preferable to form a conductor such as an air bridge around the control line as described above.

As described above, according to the present configuration, by providing the SIR 201 as the control line in the frequency-tunable resonator, transmission of energy from the resonator 301 to the control port 302, i.e., internal loss, can be suppressed.

The frequency-tunable resonator 300 may be used in a transmon, or may be used in a Josephson parametric oscillator or a Josephson parametric amplifier, for example. An increase in an internal Q factor in the Josephson parametric amplifier leads to an increase in the amplification efficiency (quantum efficiency) of a signal. However, when the frequency-tunable resonator 300 is applied to a transmon and the control signal CON of high frequency is used, the control signal CON of high frequency provided from the outside to the control port 302 needs to be calibrated in advance in consideration of the SIR 201 that is the control line. In other words, when the frequency-tunable resonator 300 is applied to the transmon, the control signal CON before transmission through the SIR201 needs to be calibrated in advance so that the control signal CON after transmission through the SIR201 becomes a desired square wave.

Other Embodiments

It should be noted that the present invention is not limited to the above embodiments and may be modified accordingly to the extent that it does not deviate from the purpose. For example, although the SIR 201 has been described to be used as the control line in the third example embodiment described above, it is merely an example. That is, any of the SIRs according to the above-described example embodiments other than the SIR 201 may be used as the control line.

In the second example embodiment, the configuration in which the three fishbone waveguides and the two curved or linear waveguides connecting the three fishbone waveguides are alternately connected has been described. However, it is merely an example. That is, when M is an integer of two or more, any M fishbone waveguides and M−1 curved or linear waveguides each connecting the two adjacent fishbone waveguides may be alternately connected. For example, two fishbone waveguides and one curved or linear waveguide connecting them may be connected. Further, four or more fishbone waveguides and three or more curved or linear waveguides connecting the two adjacent fishbone waveguides may be connected.

Some or all of the above embodiments may be described in the following supplementary notes, but are not limited to the following.

(Supplementary Note 1) A resonator including: a coplanar waveguide having a first impedance; and a section having a second impedance different from the first impedance and including a fishbone waveguide, in which the resonator is configured as a stepped impedance resonator in which the coplanar waveguide and the section including the fishbone waveguide are connected in series.

(Supplementary Note 2) The resonator according to Supplementary Note 1, in which waveguides included in the section including the fishbone waveguide is impedance-matched.

(Supplementary Note 3) The resonator according to Supplementary Note 2, in which the coplanar waveguide having the first impedance is configured as a curved waveguide.

(Supplementary Note 4) The resonator according to Supplementary Note 3, in which the curved waveguide includes a first curved waveguide and a second curved waveguide, and the section including the fishbone waveguide is inserted between the first curved waveguide and the second curved waveguide.

(Supplementary Note 5) The resonator according to Supplementary Note 4, in which the section including the fishbone waveguide includes a plurality of the fishbone waveguides having the same configuration and at least one linear waveguide that is a coplanar waveguide, and two adjacent fishbone waveguides of the plurality of the fishbone waveguides are connected by one of the at least one linear waveguide.

(Supplementary Note 6) The resonator according to Supplementary Note 3, in which the section including the fishbone waveguide includes a plurality of sections in which the fishbone waveguides are respectively arranged and a plurality of the curved waveguides, and two adjacent sections of the plurality of sections are connected by one of the plurality of the curved waveguides.

(Supplementary Note 7) The resonator according to Supplementary Note 6, in which each of the plurality of the curved waveguides is configured as a U-shaped coplanar waveguide.

(Supplementary Note 8) The resonator according to Supplementary Note 7, in which two of the plurality of the curved waveguides connected to one of the plurality of sections are curved in opposite directions.

(Supplementary Note 9) The resonator according to Supplementary Note 8, in which the plurality of sections having a first direction as a longitudinal direction are arranged in a second direction orthogonal to the first direction, one of two curved waveguides included in the plurality of the curved waveguides connected to one section is configured as a coplanar waveguide protruding from one end of the one section in the first direction, being curved counterclockwise, and extending in a direction opposite to the first direction, and the other of the two curved waveguides is configured as a coplanar waveguide protruding from the other end of the one section in the direction opposite to the first direction, being curved counterclockwise, and extending in the first direction.

(Supplementary Note 10) The resonator according to Supplementary Note 7 or 8, in which, in a first section at one end of the plurality of sections, an end that is opposite to an end connected to the curved waveguide is connected to a first coplanar waveguide that is a linear waveguide, and, in a second section at the other end of the plurality of sections, an end that is opposite to an end connected to the curved waveguide is connected to a second coplanar waveguide that is a linear waveguide.

(Supplementary Note 11) The resonator according to any one of Supplementary Notes 6 to 10, in which one fishbone waveguide is arranged in each of the plurality of sections.

(Supplementary Note 12) The resonator according to any one of Supplementary Notes 6 to 10, in which a plurality of the fishbone waveguides and one or more linear coplanar waveguides each connecting two adjacent fishbone waveguides of the plurality of the fishbone waveguides are arranged in each of the plurality of sections.

(Supplementary Note 13) The resonator according to Supplementary Note 5, in which a ground conductor is provided around the plurality of the fishbone waveguides and the plurality of linear waveguides, a conductive path that straddles a part or all of the plurality of linear waveguides is formed, and both ends of the conductive path are connected to the ground conductor.

(Supplementary Note 14) The resonator according to any one of Supplementary Notes 6 to 12, in which a ground conductor is provided around the plurality of sections and the plurality of the curved waveguides, a conductive path that straddles a part or all of the plurality of the curved waveguides is formed, and both ends of the conductive path are connected to the ground conductor.

(Supplementary Note 15) The resonator according to Supplementary Note 12, in which a ground conductor is provided around the plurality of sections and the plurality of the curved waveguides, a conductive path that straddles a part or all of one or more linear coplanar waveguides in a part or all of the plurality of sections, and both ends of the conductive path are connected to the ground conductor.

(Supplementary Note 16) A frequency-tunable resonator including: the resonator according to Supplementary Note 1 or 2; an external resonator whose resonance frequency is controlled in response to a control signal; and a control port to which the control signal is input, in which one end of the resonator is magnetically connected to the external resonator, the other end of the resonator is electrically connected to the control port, and a resonance frequency of the resonator is different from a resonance frequency of the external resonator.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. A resonator comprising:

a coplanar waveguide having a first impedance; and a section having a second impedance different from the first impedance and including a fishbone waveguide, wherein the resonator is configured as a stepped impedance resonator in which the coplanar waveguide and the section including the fishbone waveguide are connected in series, waveguides included in the section including the fishbone waveguide are impedance-matched, the coplanar waveguide having the first impedance is configured as a curved waveguide, the section including the fishbone waveguide includes a plurality of sections in which the fishbone waveguides are respectively arranged and a plurality of the curved waveguides, and two adjacent sections of the plurality of sections are connected by one of the plurality of the curved waveguides.

2. The resonator according to claim 1, wherein each of the plurality of the curved waveguides is configured as a U-shaped coplanar waveguide.

3. The resonator according to claim 2, wherein two of the plurality of the curved waveguides connected to one of the plurality of sections are curved in opposite directions.

4. The resonator according to claim 3, wherein the plurality of sections whose longitudinal direction is a first direction are arranged in a second direction orthogonal to the first direction, one of two curved waveguides included in the plurality of the curved waveguides connected to one section is configured as a coplanar waveguide protruding from one end of the one section in the first direction, being curved counterclockwise, and extending in a direction opposite to the first direction, and the other of the two curved waveguides is configured as a coplanar waveguide protruding from the other end of the one section in the direction opposite to the first direction, being curved counterclockwise, and extending in the first direction.

5. The resonator according to claim 2, wherein, in a first section at one end of the plurality of sections, an end that is opposite to an end connected to the curved waveguide is connected to a first coplanar waveguide that is a linear waveguide, and, in a second section at the other end of the plurality of sections, an end that is opposite to an end connected to the curved waveguide is connected to a second coplanar waveguide that is a linear waveguide.

6. The resonator according to claim 1, wherein one fishbone waveguide is arranged in each of the plurality of sections.

7. The resonator according to claim 1, wherein a plurality of the fishbone waveguides and one or more linear coplanar waveguides each connecting two adjacent fishbone waveguides of the plurality of the fishbone waveguides are arranged in each of the plurality of sections.

8. The resonator according to claim 7, wherein a ground conductor is provided around the plurality of sections and the plurality of the curved waveguides, a conductive path that straddles a part or all of one or more linear coplanar waveguides in a part or all of the plurality of sections, and both ends of the conductive path are connected to the ground conductor.

9. The resonator according to claim 1, wherein a ground conductor is provided around the plurality of sections and the plurality of the curved waveguides, a conductive path that straddles a part or all of the plurality of the curved waveguides is formed, and both ends of the conductive path are connected to the ground conductor.

10. A frequency-tunable resonator comprising:

a resonator;

an external resonator whose resonance frequency is controlled in response to a control signal; and a control port to which the control signal is input, wherein one end of the resonator is magnetically connected to the external resonator, the other end of the resonator is electrically connected to the control port, and a resonance frequency of the resonator is different from a resonance frequency of the external resonator, wherein the resonator comprises:

a coplanar waveguide having a first impedance; and a section having a second impedance different from the first impedance and including a fishbone waveguide, the resonator is configured as a stepped impedance resonator in which the coplanar waveguide and the section including the fishbone waveguide are connected in series.

* * * * *